Dec. 26, 1933.  E. H. RATHBONE  1,941,054
LATHE CENTER
Filed June 16, 1931
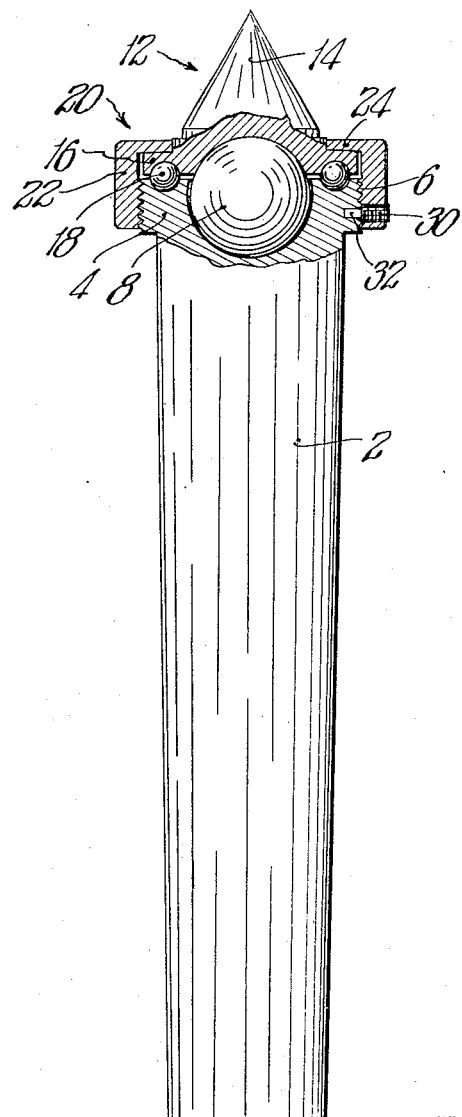
INVENTOR.
Elbridge H. Rathbone.
BY
ATTORNEY.

Patented Dec. 26, 1933

1,941,054

UNITED STATES PATENT OFFICE 1,941,054

LATHE CENTER

Elbridge H. Rathbone, Palmer, Mass.

Application June 16, 1931. Serial No. 544,785

2 Claims. (Cl. 82—33)

This invention relates to improvements in centers for lathes and the like and is directed more particularly to a center having a tapering center part which is carried for rotation by a shank part in such a way that the center may freely rotate relative to the shank.

The principal objects of the invention are directed to the provision of a center wherein a center part for engaging and supporting work is rotatably mounted on a shank part in such a way as to avoid friction. At the same time the center is supported for its rotation against end and radial thrust and is held on its true axis of rotation.

The tool of the invention is adapted for use wherever it is desired to support and rotate a piece of work and according to the novel features of the invention, as will be hereinafter more fully described, the center of the invention is not only arranged to obviate friction but the device is simple in form so as to be economical to manufacture.

Various novel features and advantages of the invention will be more fully hereinafter referred to in connection with the accompanying description of the preferred form thereof which for purposes of disclosure is shown in the accompanying drawing wherein:

The figure is a side elevational view of a center tool with parts in section and showing the novel construction thereof which constitutes the invention.

Referring to the drawing now more in detail the invention will be fully described.

The invention includes a shank 2 which may be tapered as shown so as to be receivable in a spindle, chuck or the like. The upper or forward end of the shank is provided with a head portion 4 which is externally screw threaded at 6. This head has a suitable seat or socket for receiving a central bearing member 8 which is preferably in the form of a ball.

The seat and ball 8 may be arranged so that the ball may rotate in the seat, or if desired the ball may be non-rotatably carried in the head. In any event the upper side of the socket may be arranged to hold the ball from displacement.

A center 12 has a suitably tapering forward end 14 and is provided with a flange 16. Adjacent faces of the head 4 and flange 16 are provided with complemental ball races or grooves for receiving a plurality of ball members 18, such as shown. The races and balls are so arranged that the center is not only freely rotatable on the head but is held for rotation in axial alignment with the axis of the shank. The under side of the flange is provided with a central socket for receiving the ball 8 and is so arranged that the center 12 may bear on the ball 8 as it bears on the balls 18.

A retainer 20 has a skirt portion 22 which is internally screw threaded and in engagement with the screw-threaded portion of the shank 4 and has a flange 24 for overlying the flange 16 of the center. The retainer may be screwed onto the head in such a way as to cause the flange and head to be drawn together to eliminate play between the parts. A retaining screw 30 is threaded in the skirt of the retainer 20 and has a pilot 32 for fitting in a suitable socket in the head 4. This screw 30 is adapted to hold the retainer in place and thereby hold the parts against displacement.

The arrangement of the balls is such that the center 12 is supported for rotation on a true axis. At the same time the balls allow the center to rotate without undue friction and support it against radial and endwise thrusting pressures.

By allowing the center to rotate with the work the usual wear between the center and work is obviated. Since the center is mounted on the shank by means of the balls, friction is eliminated between these parts all to the end that the work is freely rotatable. By avoiding friction between the center and the work and between the center and the shank it is possible to perform delicate and accurate cutting operations on the work.

By providing the inner ball which is separate from the outer group of balls the center is efficiently supported for its rotation, while at the same time it is held and supported in accurate axial alignment with the shank which is necessary in order to produce accurate work.

Various changes may be made in the form of the device without departing from the spirit and scope thereof and therefore I prefer to be limited by the appended claims rather than by the foregoing description.

What I claim is:

1. A center of the class described comprising in combination, a shank having an end cylindrical head portion, an end face on the outer side thereof provided with a centrally disposed ball-socket and a separate ball-race therearound concentrically disposed with respect thereto, a single aligning ball in said socket and a set of thrust balls in said ball race, all of which balls have their outer sides extending beyond the said end face of the head portion, the plane of the center of the single ball being parallel to and closely adjacent the plane of the centers of the set of balls and both of said planes being closely adjacent the plane of said end face of the head, a center member having an inner end face provided with a centrally disposed ball-socket and a separate ball-race therearound receiving the balls in said socket and ball-race of the head and provided with a peripheral flange and a centrally disposed outwardly extending center portion, and a ring-like retainer member having a skirt portion in engagement with the head portion and a portion overlying the flange of the center member.

2. A center of the class described comprising in combination, a shank having an end cylindrical head portion, an end face on the outer side thereof provided with a centrally-disposed ball-socket and a separate ball-race therearound concentrically disposed with respect thereto, a single aligning ball in said socket and a set of thrust balls in said ball-race, all of which balls have their outer sides extending beyond the said end face of the head portion, the plane of the center of the single ball being parallel to and closely adjacent the plane of the centers of the set of balls and both of said planes being closely adjacent the plane of said end face of the head, a center member having an inner end face provided with a centrally disposed ball-socket and a separate ball-race therearound receiving the balls in said socket and ball-race of the head and provided with a peripheral flange and a centrally disposed outwardly extending center portion, a ring-like retainer member having a skirt portion in engagement with the head portion and a portion overlying the flange of the center member, and means to hold said retainer member and head portion against relative movement.

ELBRIDGE H. RATHBONE.